May 4, 1943. B. M. HYMAN 2,318,400
TRACTOR MOUNTED PICKER SHELLER
Filed March 10, 1941 2 Sheets-Sheet 1

Inventor
Benjamin M Hyman
By Paul Pippel
Att'y.

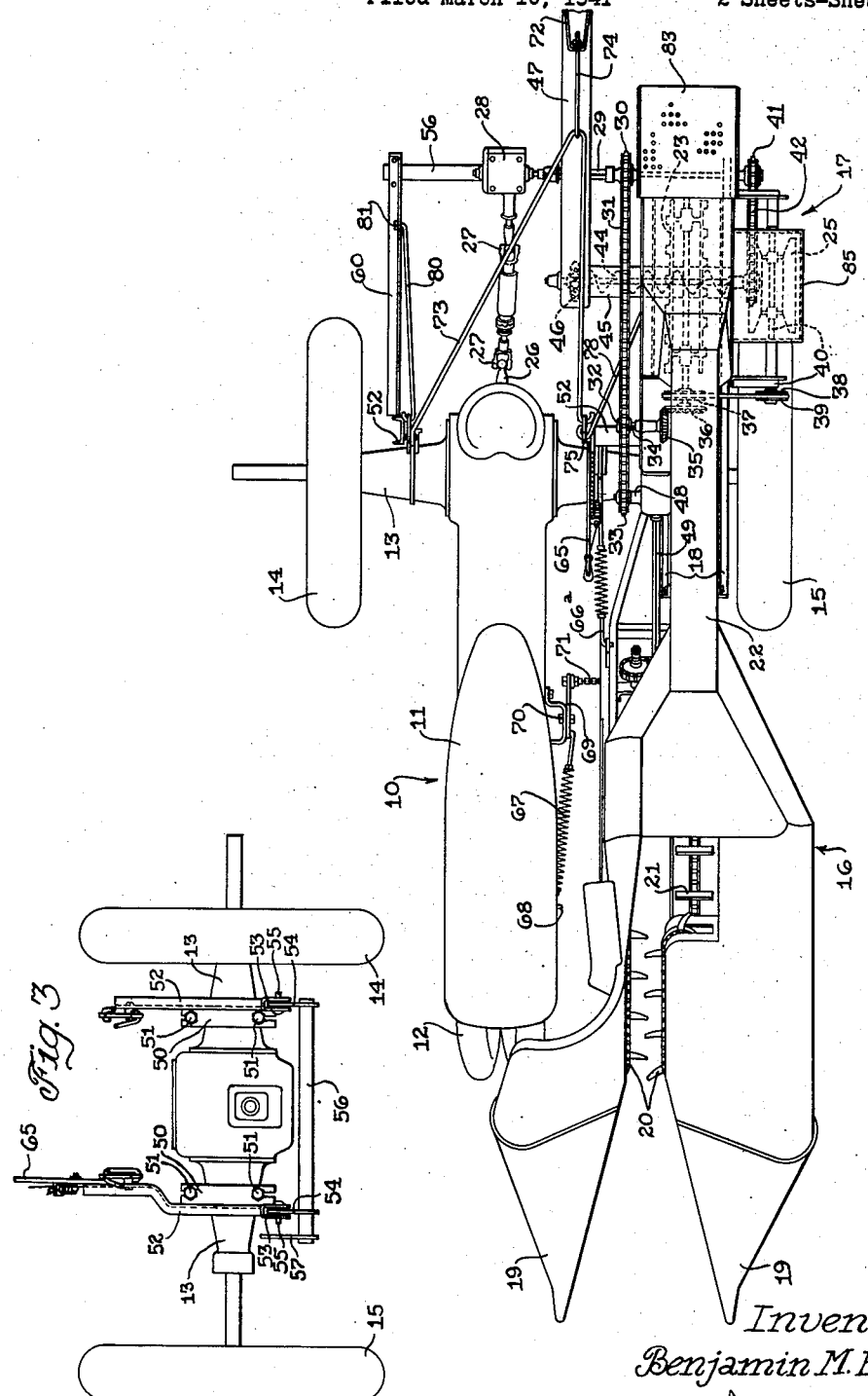

Patented May 4, 1943

2,318,400

UNITED STATES PATENT OFFICE 2,318,400

TRACTOR-MOUNTED PICKER SHELLER

Benjamin M. Hyman, Moline, Ill., assignor to International Harvester Company, a corporation of New Jersey Application March 10, 1941, Serial No. 382,552

6 Claims. (Cl. 56—18)

This invention relates to a harvester construction. More specifically it relates to a tractor-mounted picker sheller.

It has been known for some time to mount on a tractor a harvester which both picks and husks corn. With the increased use of corn which may be shelled immediately after it is picked, it becomes desirable to mount upon a tractor a device which will both pick and shell corn.

An object of the present invention is to provide an improved harvester construction.

A further object is the provision of an improved device for picking and shelling the corn.

Another object is to provide a tractor-mounted corn picker and sheller.

According to the present invention a corn harvester which comprises a picking unit and a shelling unit is mounted in balanced relation over the rear axle of a tractor, the picker unit being in front of the rear axle and the sheller unit being to the rear thereof. The units are carried on a framework which is pivotally connected to the rear axle of the tractor.

In the drawings:

Figure 2 is a plan view of the structure of Figure 1;

Figure 3 is a sectional view taken along the line 3—3 of Figure 1 with certain parts omitted.

Figures 1, 4:
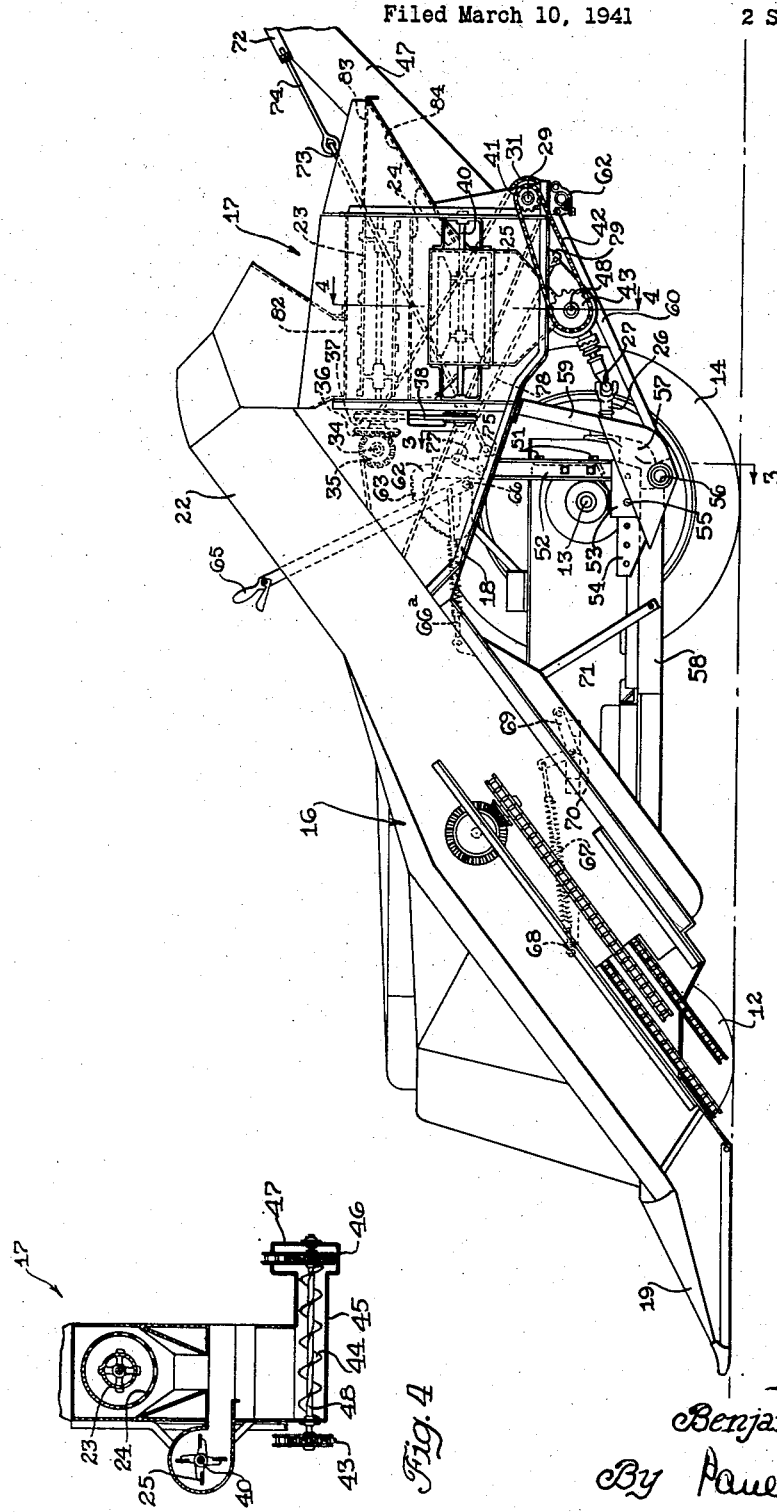
Figure 1 is a side view of a tractor and the picker sheller of the present invention mounted thereon.
Figure 4 is a sectional view taken along the line 4—4 of Figure 1.

The copending application of Hyman et al., Serial No. 210,464, filed May 27, 1938, shows the mounting of a harvesting device upon a tractor, the harvesting device comprising a picker and husker. The present invention differs from that of the Hyman et al. application, among other things, in that it relates to the mounting of a picker and sheller upon a tractor. As seen in the drawings of the present application, a tractor 10 of the tricycle type is provided with a narrow body 11, front truck 12, rear axle 13, and rear wheels 14 and 15. The rear wheel 15 is spaced from the tractor body 11 a greater distance than the rear wheel 14 so that space is provided for the harvester unit of the present invention. This unit comprises a picking unit 16 in front of the rear axle alongside the tractor body adjacent the ground and a sheller unit 17 positioned rearwardly of the rear axle in longitudinal alinement with the picker unit and rigidly connected thereto by means of angle members 18 forming part of the base of the sheller unit. The picker unit includes a pair of divider points 19, a pair of snapping rolls, not shown, positioned beneath the points, gathering chains 20, and an elevator 21 extending up through a housing 22. The sheller unit includes a shelling cylinder 23, a perforated plate 24 beneath the cylinder, and a fan 25 to one side of and below the cylinder 23. Drive of the cylinder originates with a power take-off shaft 26 at the rear of the tractor and proceeds through universal joints 27 and a gear box 28 to a transverse shaft 29 supported at its outer end on the rear end of the angle members 18. A sprocket 30 is secured to the shaft 29 and drives a sprocket chain 31 which in turn drives sprockets 32 and 33. The sprocket 32 drives a stub shaft 34 which in turn drives a bevel gear 35 secured thereto. The bevel gear 35 meshes with another bevel gear 36 which is secured to the end of the cylinder 23. A pulley 37 is mounted on the cylinder 23 and drives a belt 38 which in turn drives a pulley 39 mounted on a shaft 40 upon which the fan 25 is secured. At the outer end of the shaft 29 is secured a sprocket 41 which drives a chain 42. This chain drives a sprocket 43 secured to the end of a helical conveyor 44 positioned within a cylindrical housing 45. A sprocket 46 secured to one end of the helical conveyor 44 drives a wagon elevator, not shown, within a housing 47.

The sprocket 33 drives a stub shaft 48 to which it is secured. The stub shaft 48 transmits drive by means not shown, to a shaft 49 which in turn drives the snapping rolls, gathering chains 20, and elevator 21 in a manner not shown, since it forms no part of the present invention.

The picker and sheller as a rigid unit are pivotally carried upon the tractor in the manner shown for the carrying of rigidly connected picker and husker units in the aforementioned application of Hyman et al. As shown in Figure 3, and in the Hyman et al. application, plates 50 are attached to the rear axle housing 13 by bolts 51. Channel members 52 are secured to the plate members 50 and carry at their lower ends U-shaped parts 53. Plates 54 are pivotally connected to the U-shaped parts 53 by pins 55 and support a cross pipe 56 forming part of a supporting framework. A gusset plate 57 is secured to one end of the cross pipe 56 and has secured to it supporting parts 58 and 59 extending respectively to the picker unit and to the sheller unit. At the side of the tractor opposite that on which the picker and sheller units are mounted, an angle member 60 is secured to the plate 54 and extends rearwardly providing a support at its rear end for one end of a cross pipe 56, which is carried at its other end by means of a releasable clamp 62 secured to the under side of the sheller unit 17. The cross pipe 56 forms a support for the gear box 28.

To one channel member 52 an arcuate member 62 having teeth 63 is secured. An adjusting lever 65 is pivotally mounted at 66 on the member and is connected to the picker unit 16 by means of a link 66a. A counterbalancing of the picker and sheller is effected by means of a spring 67 connected at one end as at 68 to the tractor body 11 and at the other end to one end of a bell crank 69 pivotally mounted at 70 on the tractor body and having its other end connected to the picker unit by means of a chain 71. The wagon elevator including the housing 47 is pivotally carried on the housing 45. A ball 72 is connected to the wagon elevator housing 47 and is connected to the base of a V-shaped member 73 by means of a link 74. The ends of the V-shaped member are connected to rearwardly extending horizontal arms 75 of bell cranks pivotally connected to the channel shaped members at 76 and having vertically upwardly extending arms 77. The arm 77 of one bell crank is connected by means of a link 78 to the under side of the shelling unit as at 79. The arm 77 of the other bell crank is connected by means of a link 80 to the angle member 60 as at 81. By means of the parts just described, a raising of the picker unit causes a raising of the wagon elevator housing 47 so that in turning of the tractor the elevator housing will not strike a wagon at the rear of the tractor.

In operation of the picker sheller, the tractor is driven through a field of corn with a row of corn passing between the gathering points 19. Corn is removed from the stalks by means of the snapping rolls and is conveyed upwardly by the elevator 21 through the housing 22 and dumped through an opening 82 onto the shelling cylinder 23. Corn is shelled by the cylinder and falls through the perforated plates 24 down into the housing 45 and is conveyed by the helical conveyor 44 into the wagon elevator housing 47 through which it is conveyed upwardly and discharged over a wagon, not shown, carried at the rear of the tractor. Cobs are fed out over a perforated plate 83 and dumped at the rear. Any shelled corn ejected from the cylinder along with the cobs passes through the perforated plate and falls upon an inclined part 84 and joins the corn passing through the plate 24 on its way to the helical conveyor 44. The fan 25 within a housing 85 blows air across the corn as it fall from the plate 24 and thereby separates the corn from such things as husks and corn silk.

It will be apparent from the foregoing description that a new and novel harvester construction has been provided which includes a rigidly connected picker and sheller unit pivotally mounted upon a tractor. The picker and sheller units are not by themselves new, but their association with one another upon the tractor is new. They are carried by the tractor rear axle and have a pivotal movement with respect to the tractor about pins 55. Picker and sheller units are mounted in balanced relation over the rear axle so that they balance one another and substantially no counterbalancing is required.

The intention is to limit the invention only within the scope of the appended claims.

What is claimed is:

1. A tractor-mounted corn picker and sheller comprising in combination with a tractor having a rear axle, picking and elevating means mounted alongside the forward portion of the tractor at one side thereof, said elevating means extending upwardly above and rearwardly of the rear axle, a downwardly discharging horizontal shelling cylinder mounted longitudinally of the tractor in alinement with said elevator rearwardly of the rear axle, transverse conveying means extending laterally from beneath said sheller, and a shelled corn elevator extending upwardly from said conveying means.

2. A tractor-mounted corn picker and sheller comprising in combination with a tractor having a rear axle, picking and elevating means mounted alongside the forward portion of the tractor at one side thereof, said elevating means extending upwardly above and rearwardly of the rear axle, a downwardly discharging horizontal shelling cylinder mounted longitudinally of the tractor in alinement with said elevator below the discharge end thereof and rearwardly of the rear axle, transverse conveying means extending laterally from beneath said sheller, a shelled corn elevator extending upwardly from said conveying means, a fan mounted laterally of the shelling cylinder below the cylinder for directing air transversely beneath the shelling cylinder whereby the material dropped from the cylinder is cleaned before its delivery to the conveying means.

3. A tractor-mounted corn picker and sheller comprising in combination with a tractor having a narrow body, wire tread rear wheels and a narrow front support, picking and elevating means mounted alongside the forward portion of the tractor at one side thereof, said elevating means extending upwardly above and rearwardly of the rear axle, a downwardly discharging horizontal shelling cylinder mounted longitudinally of the tractor in alinement with said elevator rearwardly of the rear axle and substantially within the space between the wheel and the body of the tractor, transverse conveying means extending from beneath said sheller to a point centrally of the tractor, a shelled corn elevator centrally of the tractor extending upwardly and rearwardly from said conveying means, a fan mounted laterally of the shelling cylinder vertically below the cylinder and laterally over the rear wheel at that side for directing air transversely beneath the shelling cylinder whereby the material dropped from the cylinder is cleaned before its delivery to the conveying means.

4. The combination with a tractor having a narrow body, a narrow front support and a wide tread rear axle providing thereby a space of substantial lateral width between the rear wheel and the body of the tractor, of a harvester unit pivotally supported by the axle in balanced relation thereto and comprising a picking mechanism positioned in front of the axle alongside the tractor body, an elevating means extending over the axle in the space between the wheel and the body of the tractor, and a shelling mechanism positioned at the rear of the axle in general alignment with the picking and elevating mechanism and occupying substantially the same lateral space.

5. A tractor-mounted corn picker and sheller comprising in combination with a tractor having a narrow body, wide tread rear wheels and a narrow front support, picking and elevating means mounted alongside the forward portion of the tractor at one side thereof, said elevating means extending upwardly above the rear axle, a downwardly discharging horizontal shelling cylinder mounted longitudinally of the tractor in alignment with said elevating means rearwardly of the rear axle and substantially within the space between the wheel and the body of the tractor, transverse conveying means extending from beneath said sheller to a point substantially centrally of the tractor.

6. A tractor-mounted corn picker and sheller comprising in combination with a tractor having a narrow body, wide tread rear wheels and a narrow front support, picking and elevating means mounted alongside the forward portion of the tractor at one side thereof, said elevating means extending upwardly above the rear axle, a downwardly discharging horizontal shelling cylinder mounted in alignment with said elevator rearwardly of the rear axle and substantially within the space between the wheel and the body of the tractor, transverse conveying means extending from beneath said sheller to a point substantially centrally of the tractor, a fan mounted laterally of the shelling cylinder vertically below the cylinder and laterally over the rear wheel at that side for directing air transversely beneath the shelling cylinder whereby the material dropped from the cylinder is cleaned before its delivery to the conveying means.

BENJAMIN M. HYMAN.